United States Patent
Shu et al.

(10) Patent No.: US 10,236,685 B2
(45) Date of Patent: Mar. 19, 2019

(54) POWER ELECTRONIC VOLTAGE TRANFORMING APPARATUS WITH SINGLE-PHASE POWER ELECTRONIC TRANSFORMERS

(71) Applicant: Southwest Jiaotong University, Chengdu (CN)

(72) Inventors: Zeliang Shu, Chengdu (CN); Linghui Meng, Suzhou (CN); Wenjun Mao, Shanghai (CN); Yuan Lei, Weinan (CN); Yi Qian, Wuxi (CN); Xiaoqiong He, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 15/802,438

(22) Filed: Nov. 2, 2017

(65) Prior Publication Data
US 2018/0375326 A1    Dec. 27, 2018

(30) Foreign Application Priority Data
Jun. 21, 2017    (CN) .......................... 2017 1 0472765

(51) Int. Cl.
| H02J 3/06 | (2006.01) |
| H02J 3/18 | (2006.01) |
| H02J 3/01 | (2006.01) |
| H02M 5/458 | (2006.01) |

(52) U.S. Cl.
CPC .................... *H02J 3/06* (2013.01); *H02J 3/01* (2013.01); *H02J 3/1842* (2013.01); *H02M 5/458* (2013.01)

(58) Field of Classification Search
None
See application file for complete search history.

(56) References Cited

U.S. PATENT DOCUMENTS

| 8,923,024 | B2 * | 12/2014 | Katayama | H02M 7/49 363/65 |
| 9,407,165 | B2 * | 8/2016 | Wu | H02M 7/49 |
| 10,153,710 | B1 * | 12/2018 | Barbosa | H02M 7/04 |
| 2009/0244945 | A1 * | 10/2009 | Hatanaka | H02M 7/23 363/127 |
| 2010/0142234 | A1 * | 6/2010 | Abolhassani | H02M 5/4585 363/41 |
| 2013/0021006 | A1 * | 1/2013 | Fornage | H02M 7/48 323/234 |
| 2014/0119068 | A1 * | 5/2014 | Hasegawa | H02M 5/4585 363/37 |
| 2017/0338651 | A1 * | 11/2017 | Fishman | H02J 3/01 |

* cited by examiner

*Primary Examiner* — Henry E Lee, III
(74) *Attorney, Agent, or Firm* — Gokalp Bayramoglu (57) ABSTRACT

A power electronic voltage transforming apparatus is used in a two-phase to single-phase conversion. The power electronic voltage transforming apparatus is cooperatively used with a three-phase to two-phase transformer to convert the two-phase power output from the three-phase to two-phase transformer into single-phase power. The two-phase to single-phase power electronic voltage transforming apparatus or three-phase to single-phase power electronic voltage transforming apparatus has an input cascade connection structure formed by cascading n converter modules.

3 Claims, 6 Drawing Sheets

POWER ELECTRONIC VOLTAGE TRANFORMING APPARATUS WITH SINGLE-PHASE POWER ELECTRONIC TRANSFORMERS

CROSS REFERENCE TO RELATED APPLICATIONS

This application is based upon and claims priority to Chinese Patent Application No. CN 201710472765.9 (CN), filed on Jun. 21, 2017, the entire content of which is incorporated herein by reference.

TECHNICAL FIELD

The present invention relates to electric railway traction power supply technology and other related fields using three-phase to single-phase transformer and two-phase to single-phase transformer.

BACKGROUND

Ordinary power supply systems are three-phase systems. However, there are many single-phase loads in practice, especially for traction power supply systems and industrial electricity. The electric railway uses single-phase power frequency AC system, wherein the traction power supply system is connected to the electricity system through the traction substation, and the core equipment of the traction substation is the traction transformer. In recent years, a three-phase to two-phase transformation is applied to the traction transformer of Vv wiring in a direct supply style, the traction transformer of Vx wiring in an AT-style, Ynvd traction transformer, and Scott traction transformer etc., but the traction power supply system still has two essential problems: phase separation problem and negative sequence problem. The problem of phase separation creates a dead zone for the power supply lines. The dead zone significantly affects the overall performance of the traction power supply system. The traction load belonging to a single-phase load is extremely asymmetric, so that a large amount of negative sequence current is introduced into the electricity system, and an extreme imbalance is caused to the three-phase power grid. Moreover, when the locomotive operates with the emergency brakes, the energy generated thereby cannot be returned to the power grid, and only resistors are used to consume the redundant energy, which wastes energy. For the industrial power supply and distribution system, after receiving high voltage, it is subjected to the total step-down substation and the distribution substation. After that, each plant substation takes a certain phase from the three-phase power of the substation. Power supply system needs to go through a plurality of substations, so the process is repetitive and complex. The power frequency transformers in the substation have a large size and weight. Moreover, since the loads of the power frequency transformers are single-phased, both a sudden increase and a sudden reduction will cause the above-mentioned adverse phenomenon.

In view of the drawbacks of the prior art, and in order to solve above problems, a power electronic voltage transforming apparatus, which mainly converts the three-phase power and two-phase power into a single-phase power, is provided. By using the apparatus, the dynamic compensation of negative sequence and reactive power can be realized; the harmonic wave of the single-phase load can be controlled, and the quality of electric energy in the power supply section can be improved. Furthermore, passing the phase separation of the existing traction power supply system can be avoided to achieve energy feedback, etc. The apparatus contributes to the development of high-speed and heavy-load railway. Furthermore, the power frequency transformers of the substations in the industrial power supply and distribution system can be removed to save the land usage.

SUMMARY OF THE INVENTION

The objectives of the present invention are to provide a power electronic voltage transforming apparatus which can effectively solve the problems of dynamic control of negative sequence current, compensation of reactive power, and phase separation of traction network.

The objectives of the present invention are realized through the following technical solutions. The internal transformers of the substations are improved. The two-phase power is converted into a single-phase power via a power electronic converting apparatus or a substitution, or the three-phase power of the power supply network is directly converted into a single-phase power by means of the present invention. Passing the phase separation can be removed when applying the apparatus in the traction power supply system of the train, and when the trailed locomotive is in the regenerative braking, the qualified electric energy can provide feedback to the power grid to achieve a bi-directional flow of energy. Moreover, intended purposes also can be achieved when the present invention is applied to other related fields. The single-phase power electronic transformer of the apparatus uses a multi-level cascade input, and the output can be connected in series or in parallel. In summary, the apparatus is not only beneficial for the development of both railway and other related fields, but is also environment friendly and energy-saving.

To solve the problems, the technical solutions of the invention are as follows.

A power electronic voltage transforming apparatus is used in a two-phase to single-phase conversion, and the apparatus is cooperatively used with a three-phase to two-phase transformer to convert the two-phase power output from the three-phase to two-phase transformer into a single-phase power. Both X and Y are single-phase power electronic transformers formed by a cascade connection of n converter modules. When the three-phase to two-phase transformer is a Scott transformer, two single-phase powers of α phase and β phase are output. The two-phase to single-phase power electronic transformers are cooperatively used with the Scott transformer. The α phase is connected to X1P of the two-phase to single-phase power electronic transformer X through a connection to a reactor LX. The β phase is connected to Y1P of Y through a connection to a reactor LY. XnN of the X is connected to YnN of Y. When a parallel output is used, x1P of X is connected to y1P of Y, and then connected to a terminal P of a single-phase power supply network via a reactor L. xnN of X is connected to ynN of Y, and then connected to a terminal N of the single-phase power supply network. When a series output is used, the x1P of X is connected to the ynN of Y, the y1P is connected to a P phase of the single-phase power supply network via the reactor L, and the xnN of X is connected to the single-phase power supply network N. When the three-phase to two-phase transformer is a Vv wiring transformer, two single-phase powers of T1 phase and T2 phase are output. The two-phase to single-phase power electronic transformer is cooperatively used with the Vv wiring transformer. The YnN of Y is connected to the XnN of X, the T2 phase is connected to the YIP of Y via a reactor LY, and the T1 phase is connected to the X1P of X via a reactor LX. The xnX of the X is connected to the N, and the y1P of Y is connected to the P phase of the single-phase power supply network via the reactor L. When the parallel output is used, the x1P is connected to the y1P, and the xnN is connected to the ynN. When the series output is used, the x1P is connected to the ynN.

A power electronic voltage transforming apparatus is applied to a three-phase to single-phase transformation. The phases A, B and C of the three-phase power grid are connected to the output via reactors LA, LB and LC which are connected to n (n>1) converters in a cascade connection. Wherein, a1P of phase A is connected to bnN of the n-th converter of a phase B. Similarly, b1P of the phase B is connected to cnN of a phase C, and c1P of the phase C is connected to the terminal P of the single phase power supply network via the reactor to form a single phase power supply network in series connection structure. When the phases A, B and C are connected to the single-phase power supply network in a parallel connection structure, the a1P of the phase A is connected to the b1P of the phase B and the c1P of the phase C and then connected to the terminal P of the single-phase power supply network via the reactor. Moreover, the anN of the phase A is connected to the bnN of the phase B and the cnN of the phase C and then connected to the terminal N of the single-phase power supply network.

Taking the phases α and β as an example, the manner of the cascade connection of the converter modules is as follows. A wiring manner of a left end input of the X of the phase α and the Y of the phase β is that: a positive input terminal X1P of a X converter module 1 is connected to output, a negative input terminal X1N of the X converter module 1 is connected to a positive input terminal X2P of the X converter module 2, and a negative input terminal X2N of the X converter module 2 is connected to a positive input terminal X3P of a X converter module 3, by doing so, the inputs of n converter modules are connected successively. A positive output terminal x1P of the converter module 1 is connected to output, a negative output terminal x1N is connected to a positive output terminal x2N of the converter module 2, and the rest is done in the same manner. The n converter modules of the single-phase power electronic transformer Y are also connected in the same manner.

The specific number n of the modules is correlated to the used switch tube and the topology. The higher the withstanding voltage of the switch tube, the smaller is the number of n. When a multi-level topology structure is used, the number of n is relatively small, otherwise, the number of modules is larger.

Compared with the prior art, the advantages of the present invention are as follows.

1. The two-phase to single-phase voltage transforming apparatus of the invention can be applied in a single-phase power supply system. Based on the existing substations, the two single-phase powers α (T1) and β (T2) are converted into one single-phase power, and no transformation of the substations is required, thus, the present invention is more applicable, and has high economic efficiency.
2. The three-phase to single-phase voltage transforming apparatus of the invention can be applied in a single-phase power supply system. The voltage transforming apparatus can directly convert the three-phase power into a single-phase power to supply for single-phase load, thereby eliminating the need for substations and realizing the control of active power and reactive power.
3. By applying the present invention, a co-phase power supply can be realized and the electric phase separation of the traction network can be canceled, so that the dynamic compensation of negative-sequence and reactive power, the control of the harmonics of the single-phase load and the requirement of energy feedback can be realized, thereby improving the power quality of the power grid.
4. The single-phase to single-phase converter of each phase in cascade connection is then output in series or in parallel, so that the output voltage level is improved.
5. The phase, frequency and amplitude of the voltage output by the inverter can be adjusted according to the voltage information of the power supply network, so as to satisfy the user's requirements, improve the power quality and realize the bidirectional flow of energy.

DETAILED DESCRIPTION OF THE INVENTION

Figure 1:
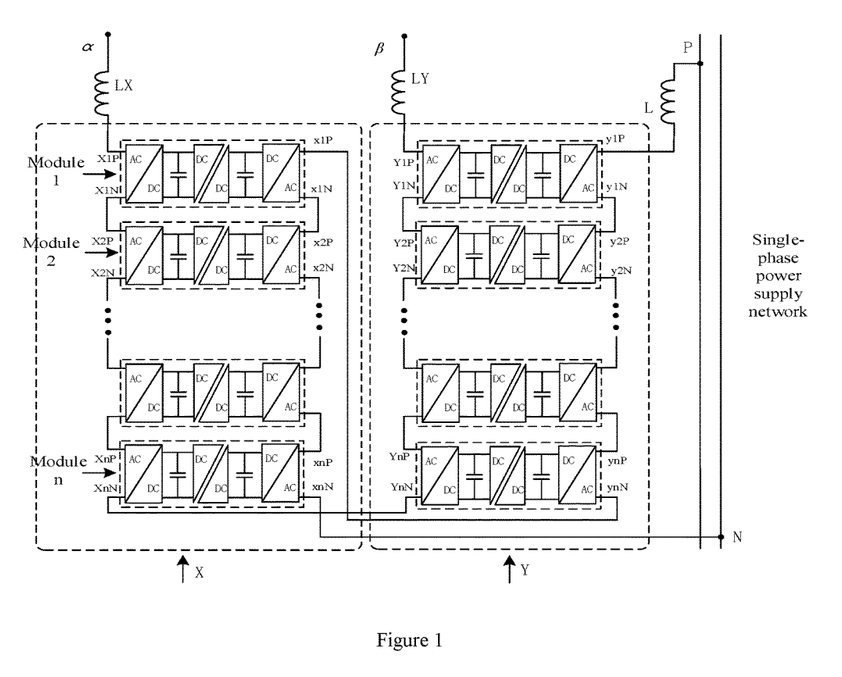
FIG. 1 is a structural diagram of the output-series type of the two-phase to single-phase power electronic voltage transforming apparatus.
Figure 2:
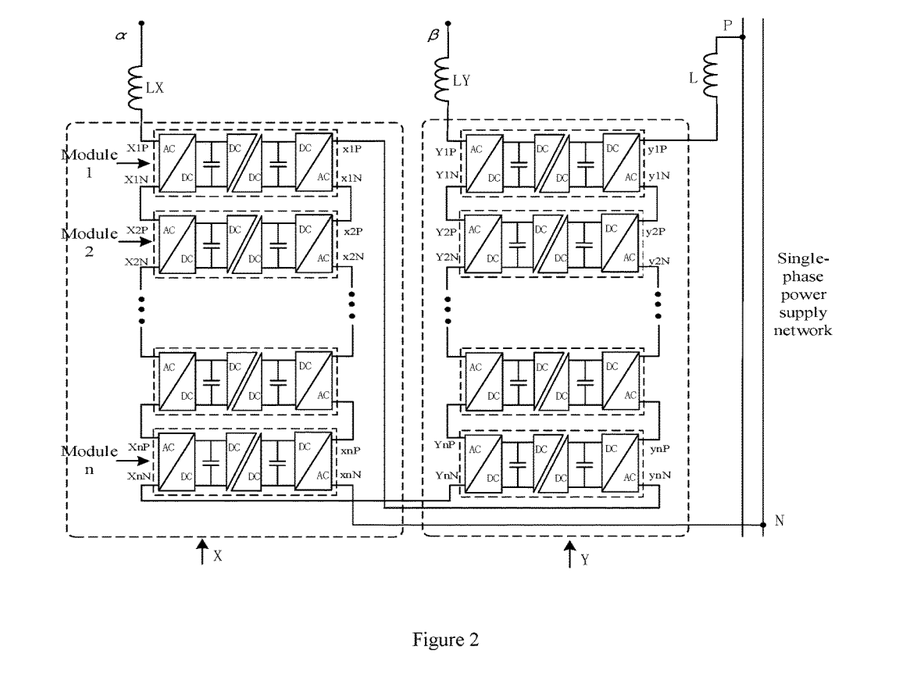
FIG. 2 is a structural diagram of the output-parallel type I of the two-phase to single-phase power electronic voltage transforming apparatus.
Figure 3:
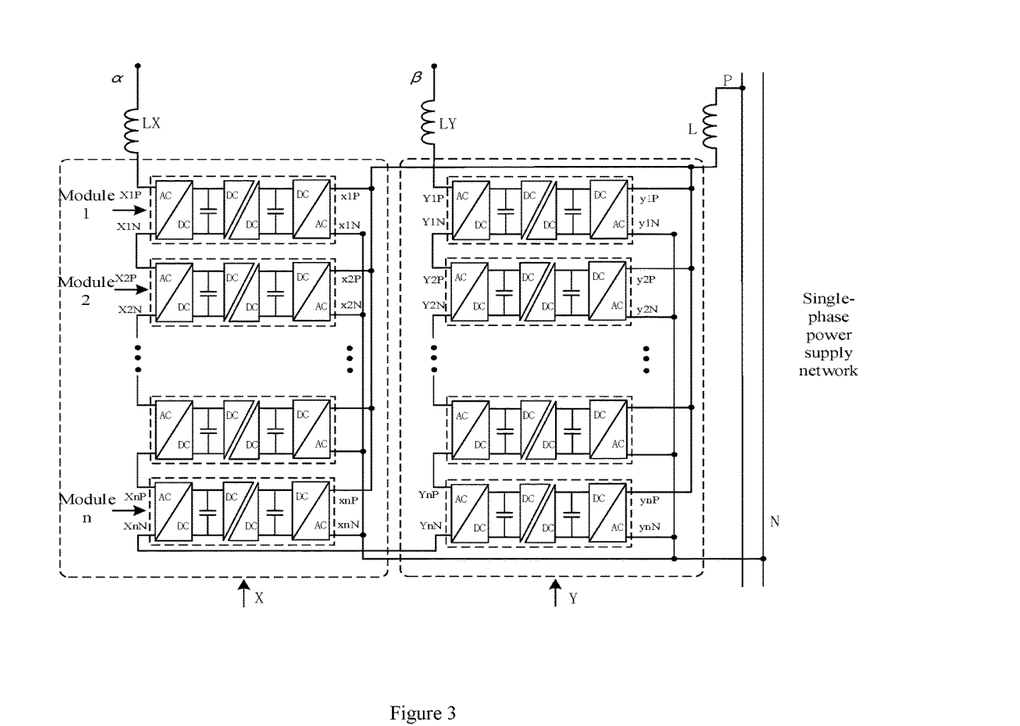
FIG. 3 a structural diagram of the output-parallel type II of the two-phase to single-phase power electronic voltage transforming apparatus.
Figure 4:
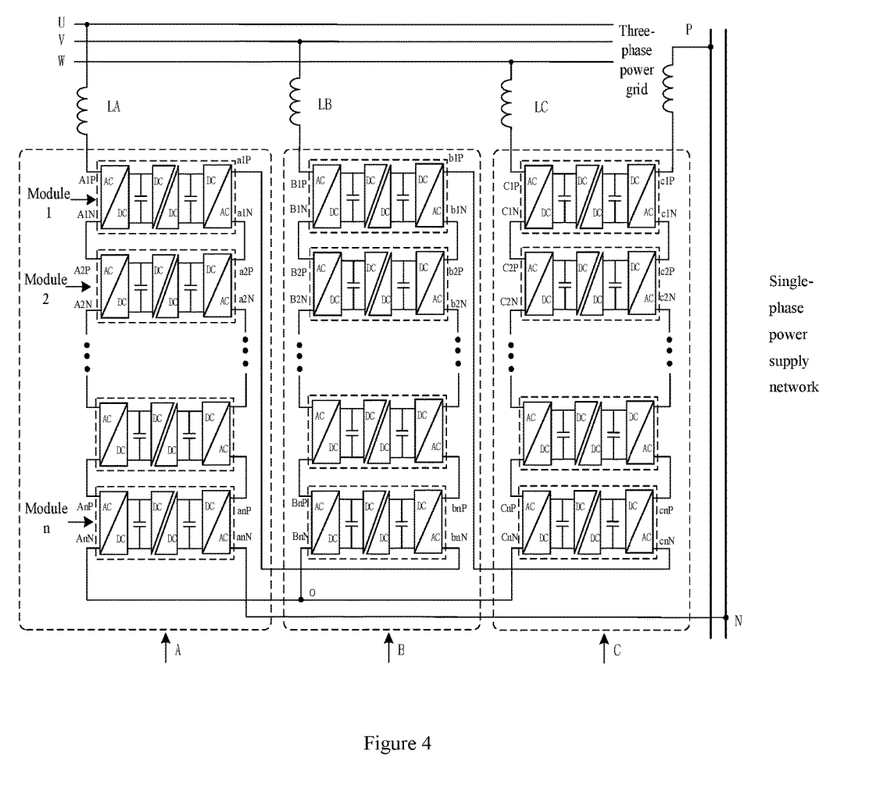
FIG. 4 is a structural diagram of the output-series type of the three-phase to single-phase power electronic voltage transforming apparatus.
Figure 5:
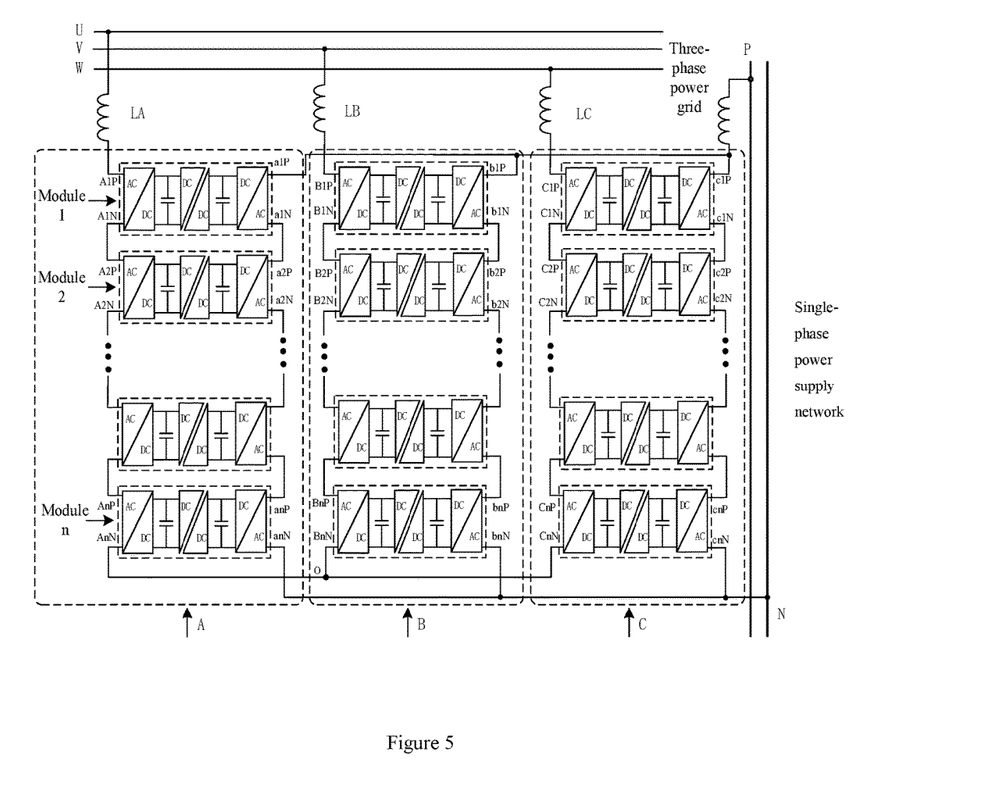
FIG. 5 is a structural diagram of the output-parallel type I of the three-phase to single-phase power electronic voltage transforming apparatus.
Figure 6:
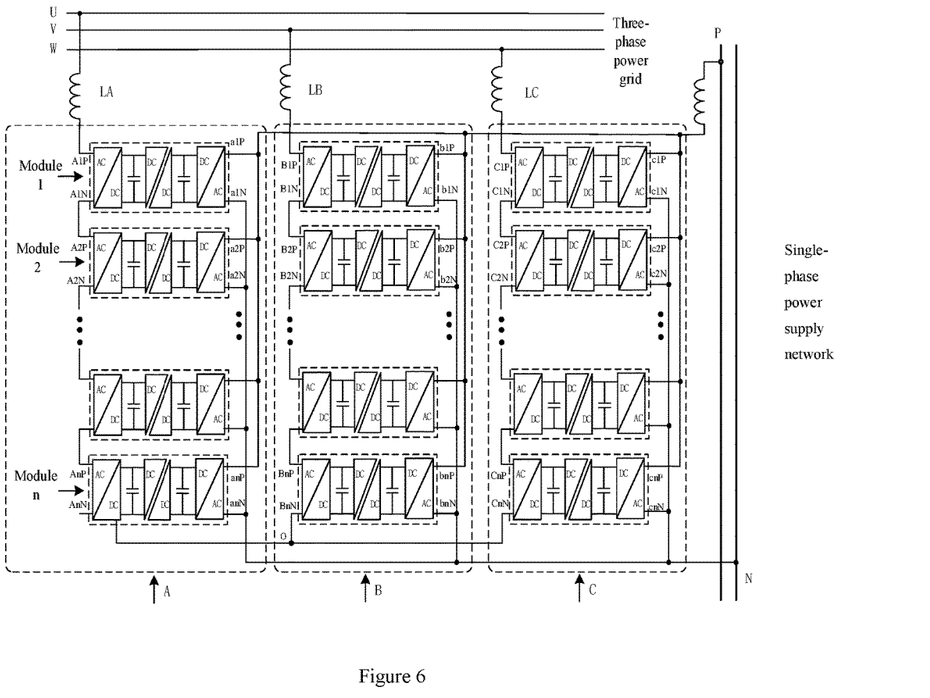
FIG. 6 a structural diagram of the output-parallel type II of the three-phase to single-phase power electronic voltage transforming apparatus.

The structural diagrams of three different output methods of the two-phase to single-phase power electronic voltage transforming apparatus of the present invention are shown in FIGS. 1, 2 and 3. The structural diagrams of three different output methods of the three-phase to single-phase power electronic voltage transforming apparatus of the present invention are shown in FIGS. 4, 5 and 6. A multi-phase to single-phase voltage transforming apparatus is mainly used to convert three-phase power into single-phase power and two-phase power into single-phase power, and includes a plurality of single-phase power electronic transformers. When the power electronic voltage transforming apparatus is used in a three-phase power network U, V and W, the power electronic voltage transforming apparatus includes three single-phase power electronic transformers A, B and C. When the power electronic voltage transforming apparatus is used to convert a two-phase power into a single-phase power, the power electronic voltage transforming apparatus includes two single-phase power electronic transformers X and Y. A positive terminal of the single-phase power supply network is P, and a negative terminal is N. Moreover, a. When the power electronic voltage transforming apparatus is used in two-phase to single-phase conversion, two phases of power α and β are connected to positive input terminals X1P and Y1P of a two-phase to single-phase voltage transforming apparatus X and Y via a connection to reactors LX and LY, and a negative input terminal XnN of X is connected to a negative input terminal YnN of Y. When an output-parallel structure is used, x1p of the X is connected to y1p of the Y and then connected to P via the reactor L. xnN of the X is connected to ynN of the Y and then connected to the N. When the output-series structure is used, =x1P is connected to the ynN, y1P is connected to the P via the reactor L, and the xnN is connected to the N.

b. When the voltage transforming apparatus is used in three-phase to single-phase conversion, the three-phase to single-phase voltage transforming apparatus includes three single-phase power electronic transformers A, B, C. Positive input terminals A1P, B1P, C1P are connected to a three-phase power network U, V, W via the reactors LA, LB, LC. The negative input terminals AnN, BnN, CnN are commonly connected to point O. The wiring mode of the output is similar to that of the above-mentioned two-phase to single-phase power electronic transformer, which includes two types of structure, i.e. an output-parallel structure and an output-series structure. The three-phase to single-phase voltage transforming apparatus is a three-phase power network based on a Y connection, and a three-phase power network using delta connection is also acceptable by making certain modifications.

The single-phase power electronic transformers A, B, C and X, Y described in the present invention have the same wiring modes, and there are two main wiring modes. Taking A as an example, A consists of n modules. A1P of module 1 of A is connected to the output, A1N is connected to A2P of module 2, A2N is connected to A3P of module 3, and the rest is done in the same manner. The a1N of module 1 is connected to a2P of module 2, and the rest is done in the same manner to form an interphase output-series structure. The a1P of module 1 of A is connected to a2P of module 2 and a3P of module 3, a1N is connected to a2N of module 2 and a3N of module 3, and the rest is done in the same manner to form an interphase output-parallel structure. Similarly, the n modules of other single-phase power electronic transformers also use the same connection mode.

Each module mainly consists of a rectifier circuit, a DC-DC conversion circuit and a DC-AC conversion circuit. In view of an electrical level modulation, the circuit can be a two-level or three-level structure, or a multilevel structure. In view of the bridge structure, the circuit can be a full-bridge or a half-bridge structure. It should be noted that, the rectifier circuit, the DC-DC conversion circuit and the DC-AC conversion circuit of the converter can be a combination of the three-level, the two-level or even the multi-level and the half-bridge or the full-bridge. In addition, the DC-DC conversion circuit can further include a resonant network or a non-resonant network. The specific module number of n is correlated with the used switch tube and the used topological structure.

The present invention provides a power electronic transformer which consists of a plurality of single-phase power electronic transformers. Each single-phase power electronic transformer consists of n modules and each module consists of a rectifier circuit, a DC-DC conversion circuit and a DC-AC conversion circuit. In view of the electrical level modulation, the circuit can be the two-level or three-level structure, or the multilevel structure. In view of the bridge structure, the circuit can be a full-bridge or a half-bridge structure. In addition, the DC-DC conversion circuit can further include a resonant network or a non-resonant network. The specific module number of n is correlated with the used switch tube and the used topological structure. The structure of the present invention can withstand high voltage and high current, and has three output modes. The outputs are directly connected to the single-phase traction network, so as to improve the level of the output voltage and current. The present invention can realize the multi-phase to single-phase conversion based on all kinds of existing power supply systems without modifying the existing power supply systems, and can dynamically compensate the negative-sequence and reactive power, control the harmonics of the single-phase load, and realize the feedback of energy, thereby improving the power quality of the input and output terminals. The phase, frequency and amplitude of the voltage output by the inverter can be adjusted according to the voltage information of the power supply network, so as to satisfy the user's requirements, improve the power quality and realize the bidirectional flow of energy.

What is claimed is:

1. A power electronic voltage transforming apparatus with single-phase power electronic transformers convert a three-phase power into a single-phase power and a two-phase power into the single-phase power, comprising: a plurality of single-phase power electronic transformers,
wherein when the power electronic voltage transforming apparatus is in a three-phase power network (U, V, W), the power electronic voltage transforming apparatus comprises a first single-phase power electronic transformer, a second single-phase power electronic transformer and a third single-phase power electronic transformer; when the power electronic voltage transforming apparatus converts the two-phase power into the single-phase power, the power electronic voltage transforming apparatus comprises a fourth single-phase power electronic transformer and a fifth single-phase power electronic transformer;
wherein when the power electronic voltage transforming apparatus is in a two-phase to single-phase conversion, two phases of power (α, β) are respectively connected to positive input terminals of the fourth single-phase power electronic transformer and the fifth single-phase power electronic transformer in a two-phase to single-phase voltage transforming apparatus via a connection to a fourth reactor and a fifth reactor, and a negative input terminal of the fourth single-phase power electronic transformer is connected to a negative input terminal of the fifth single-phase power electronic transformer; when an output-parallel structure is configured, a first output terminal of the fourth single-phase power electronic transformer is connected to a first output terminal of the fifth single-phase power electronic transformer and then connected to the positive terminal of a single-phase power supply network via a sixth reactor; a second output terminal of the fourth single-phase power electronic transformer is connected to a second output terminal of the fifth single-phase power electronic transformer and then connected to the negative terminal of the single-phase power supply network; when an output-series structure is configured, the first output terminal of the fourth single-phase power electronic transformer is connected to the second output terminal of the fifth single-phase power electronic transformer, the first output terminal of the fifth single-phase power electronic transformer is connected to the positive terminal of the single-phase power supply network via the sixth reactor, and the second output terminal of the fourth single-phase power electronic transformer is connected to the negative terminal of the single-phase power supply network;

when the power electronic voltage transforming apparatus is in a three-phase to single-phase conversion, a three-phase to single-phase voltage transforming apparatus comprises the first single-phase power electronic transformer, the second single-phase power electronic transformer and the third single-phase power electronic transformer; positive input terminals of the first single-phase power electronic transformer, the second single-phase power electronic transformer and the third single-phase power electronic transformer are connected to the three-phase power network (U, V, W) via a first reactor, a second reactor and a third reactor; negative input terminals are commonly connected to a point; a wiring mode comprises the output-parallel structure and the output-series structure; the three-phase to single-phase voltage transforming apparatus is a three-phase power network based on a Y connection or a delta connection.

2. The power electronic voltage transforming apparatus with single-phase power electronic transformers of claim 1, wherein the fourth single-phase power electronic transformer and the fifth single-phase power electronic transformer of the two-phase to single-phase voltage transforming apparatus and the first single-phase power electronic transformer, the second single-phase power electronic transformer and the third single-phase power electronic transformer of the three-phase to single-phase voltage transforming apparatus have a same internal wiring mode, taking the first single-phase power electronic transformer, the first single-phase power electronic transformer consists of n modules, an internal wiring mode of the first single-phase power electronic transformer is as follows: the positive input terminal of a first module of the first single-phase power electronic transformer is connected to an output, a negative input terminal of the first module is connected to a positive input terminal of a second module, a negative input terminal of the second module is connected to a positive input terminal of a third module, and a negative input terminal of a (n−1)th module is connected to a positive input terminal of a nth module; a second output terminal of the first module is connected to a first output terminal of the second module, and a second output terminal of the (n−1)th module is connected to a first output terminal of the nth module, therefore the output series structure is formed; a first output terminal of the first module of the first single-phase power electronic transformer is connected to the first output terminal of the second module, the second output terminal of the first module is connected to a second output terminal of the second module, and a first output terminal of the (n−1)th module of the first single-phase power electronic transformer is connected to the first output terminal of the nth module, the second output terminal of the (n−1)th module is connected to a second output terminal of the nth module, therefore the output-parallel structure is formed; similarly, the n modules of the second single-phase power electronic transformer, the third single-phase power electronic transformer, the fourth single-phase power electronic transformer, and the fifth single-phase power electronic transformer also use the internal wiring mode of the first single-phase power electronic transformers.

3. The power electronic voltage transforming apparatus with single-phase power electronic transformers of claim 2, wherein each module comprises a rectifier circuit, a DC-DC conversion circuit and a DC-AC conversion circuit; the rectifier circuit, the DC-DC conversion circuit or the DC-AC conversion circuit is selected from the group consisting of a two-level structure, a three-level structure, a multilevel structure, a full-bridge structure, and a half-bridge structure; wherein, the rectifier circuit, the DC-DC conversion circuit and the DC-AC conversion circuit of the converter are a combination of the three-level structure, the two-level structure, or a combination of the multilevel structure and the half-bridge structure, or the full-bridge structure; and the DC-DC conversion circuit further comprises a resonant network or a non-resonant network; a specific module number of n is correlated with a number of a switch tube and a number of a topological structure.

* * * * *